United States Patent
Awwad

(10) Patent No.: US 9,085,218 B2
(45) Date of Patent: Jul. 21, 2015

(54) TRANSPORT REFRIGERATION UNIT AUXILIARY POWER

(75) Inventor: Nader S. Awwad, Baldwinsville, NY (US)

(73) Assignee: Carrier Corporation, Farmington, CT (US)

( * ) Notice: Subject to any disclaimer, the term of this patent is extended or adjusted under 35 U.S.C. 154(b) by 1557 days.

(21) Appl. No.: 12/602,835

(22) PCT Filed: Jun. 7, 2007

(86) PCT No.: PCT/US2007/013551
§ 371 (c)(1),
(2), (4) Date: Dec. 3, 2009

(87) PCT Pub. No.: WO2008/153518
PCT Pub. Date: Dec. 18, 2008

(65) Prior Publication Data
US 2010/0171364 A1 Jul. 8, 2010

(51) Int. Cl.
*B60H 1/32* (2006.01)

(52) U.S. Cl.
CPC .................................. *B60H 1/3226* (2013.01)

(58) Field of Classification Search
CPC ........... B60H 1/00014; B60H 1/00421; B60H 1/00428; B60H 1/3226; B60K 25/00; B60K 2025/103
USPC ............. 62/230, 239, 243, 244; 700/278, 286
See application file for complete search history.

(56) References Cited

U.S. PATENT DOCUMENTS

| 4,341,345 | A | | 7/1982 | Hammer et al. |
| 4,732,229 | A | * | 3/1988 | Lucht ........................... 180/69.6 |
| 5,333,678 | A | | 8/1994 | Mellum et al. |
| 5,515,693 | A | * | 5/1996 | Cahill-O'Brien et al. ...... 62/179 |
| 5,629,568 | A | | 5/1997 | Mertens |
| 2001/0015070 | A1 | | 8/2001 | Hara |
| 2002/0162344 | A1 | * | 11/2002 | Reason et al. ................... 62/217 |
| 2004/0194498 | A1 | * | 10/2004 | Burchill et al. .................. 62/513 |
| 2005/0109051 | A1 | * | 5/2005 | Heinle ............................. 62/236 |
| 2005/0115258 | A1 | * | 6/2005 | Violand et al. ................... 62/186 |

FOREIGN PATENT DOCUMENTS

| CN | 1119615 A | 4/1996 |
| EP | 1790921 A1 | 5/2007 |

OTHER PUBLICATIONS

Chinese Office Action for Chinese Patent Application No. 200780053245.9, dated Apr. 29, 2011.
International Search Report and Written Opinion for PCT/US2007/013551, dated Sep. 19, 2008.
European Search Report for EP Patent Application No. 07777447.9, dated Feb. 25, 2011.

* cited by examiner

*Primary Examiner* — Marc Norman
(74) *Attorney, Agent, or Firm* — Bachman & LaPointe, P.C.

(57) ABSTRACT

An auxiliary power system and method distributes and controls excess electric power that is available from a trailer box refrigeration system. The trailer box refrigeration system may have either a generator for generating direct current (DC), or an alternator for generating alternating current (ac). The generator/alternator produces power to power refrigeration system loads and excess generated power may be distributed to auxiliary loads not associated with the refrigeration system.

18 Claims, 2 Drawing Sheets

TRANSPORT REFRIGERATION UNIT AUXILIARY POWER

BACKGROUND OF THE INVENTION

The invention relates generally to the field of transport refrigeration systems. More specifically, the invention relates to methods and systems that provide auxiliary electric power from a truck trailer refrigeration unit depending on refrigeration demand.

Transport refrigeration systems such as those used on truck trailers, typically employ a mechanically coupled shaft driven compressor or an electric motor driven compressor. In the mechanical scheme, an engine such as a diesel is either directly or indirectly coupled to the refrigeration compressor. The engine may also drive the refrigeration condenser fans, evaporator fans, and other components through additional mechanical drives using pulleys, V-belts and the like.

For mechanical refrigeration systems, electric power is limited. Usually, the only available power is 12 VDC that is available from the refrigeration system engine battery. This low voltage may be used to supply power for lighting within a trailer box or for a lift gate mechanism.

In the electrical scheme, the engine is coupled to a generator or alternator of the refrigeration system which provides electric power for all refrigeration loads. Refrigeration loads typically include a compressor motor, condenser fan motors, evaporator fan motors, electric defrosting heaters, and other electric loads.

What is desired is a system that provides additional power for auxiliary loads.

SUMMARY OF THE INVENTION

The inventor has discovered that in electrical refrigeration systems, the generator or alternator produces more than enough power for the refrigeration loads and that this auxiliary power may be used to power auxiliary loads outside the refrigeration system.

One aspect of the invention provides a method for providing electric power for auxiliary electric loads from an electric transport refrigeration system used to cool a trailer box. Methods according to this aspect of the invention start with setting a trailer box interior temperature setpoint, setting an auxiliary electric load setpoint, calculating a total electrical load for the electric transport refrigeration system, calculating excess generating capacity between the total electrical load for the electric transport refrigeration system and an electric transport refrigeration system rated generation capacity, and providing auxiliary power if the trailer box temperature is less than or equal to the trailer box temperature setpoint and the calculated excess generated capacity is greater than the auxiliary electric load setpoint.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

The invention is not limited to any particular software language described or implied in the figures. A variety of alternative software languages may be used for implementation of the invention.

The invention distributes and controls excess available electric power from a trailer box refrigeration system. The trailer box refrigeration system may have either a generator for generating direct current (DC), or an alternator for generating alternating current (ac). The generator/alternator produces power to power the compressor motor, condenser fan motors, evaporator fan motors, electric defrosting heaters and other refrigeration system loads. Excess power generated by the engine-generator/alternator may be distributed and used for auxiliary loads not associated with the refrigeration system.

Various loads not associated with the trailer box refrigeration system may be powered using the engine-alternator/generator as a source of power. Examples include remote fuel tank heaters, remote fans, remote lighting equipment, trailer floor heating devices, and others.

Typical electric trailer box refrigeration systems generate three phase 460 Vac. The voltage may be stepped down or up using transformers for electrical loads operating at different potentials. Electric trailer box refrigeration systems that generate DC may use DC-DC converters to step down or up the generator output voltage. Auxiliary loads powered by the refrigeration system may be either selected for use with the generated output voltage, for example 460 Vac, or may be used with a voltage conversion device.

Figure 1:
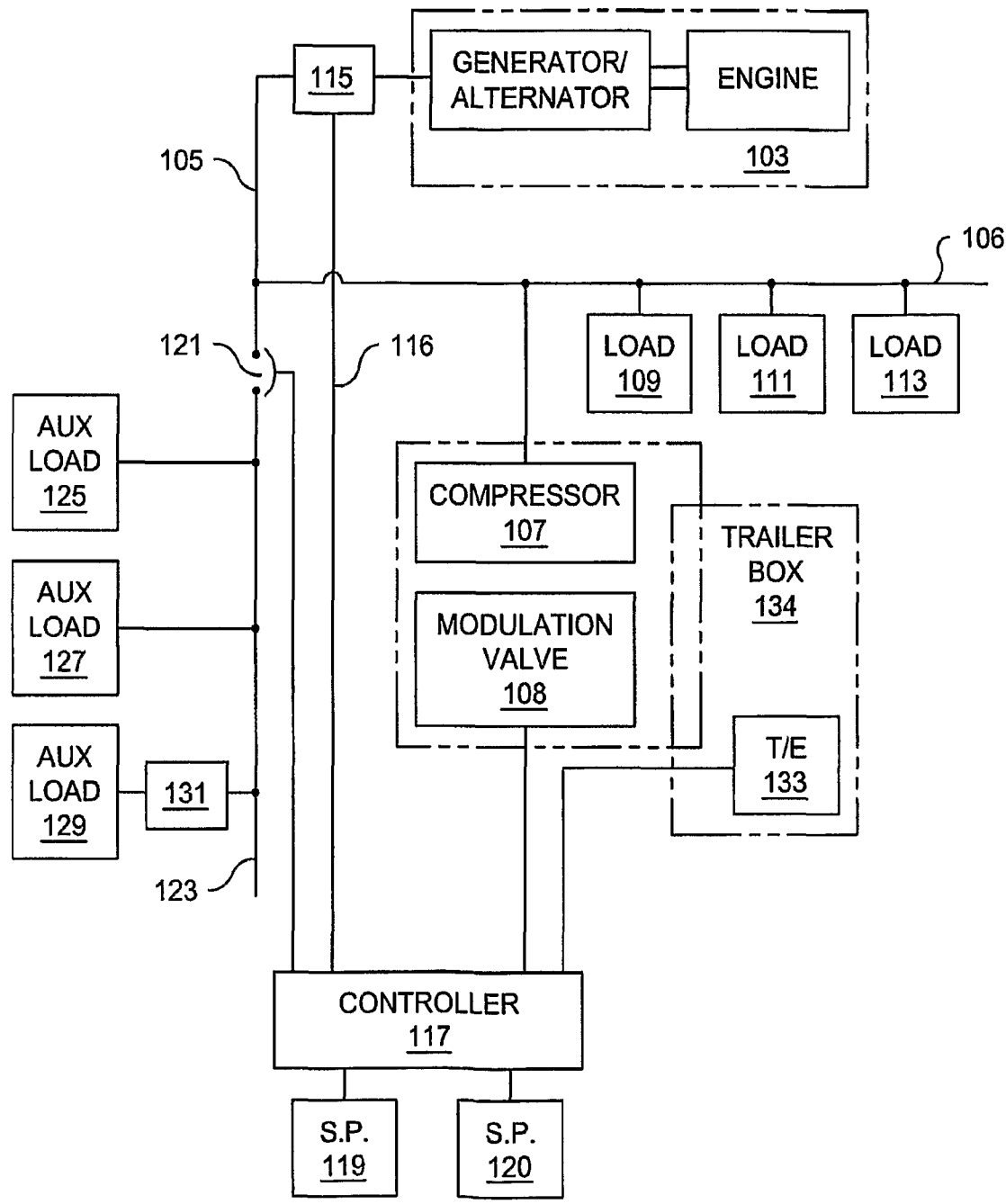
FIG. 1 is an exemplary schematic diagram for a trailer box refrigeration system auxiliary power system.

An exemplary schematic is shown in FIG. 1. A refrigeration system typically comprises an engine-generator/alternator 103, a main distribution bus 105, and a refrigeration bus 106 for distributing power to refrigeration system loads such as the compressor 107, evaporator fans 109, condenser fans 111, and other 113 loads. The auxiliary power system monitors total power output by the engine-generator/alternator 103 using a power metering assembly 115 that may be comprised of current transformers (CTs) and potential transformers (PTs) for ac applications, or current and voltage shunts for DC applications. The power metering signal 116 is coupled to a controller 117 that calculates instantaneous power consumed by the refrigeration system. The controller 117 may be microprocessor controlled and has a temperature setpoint 119 input and an auxiliary load setpoint 120 input. The auxiliary load setpoint 120 represents the power limitation of the engine-generator/alternator 103. The auxiliary power system controls around this limit.

A contactor 121 is coupled to the main bus 105 as a tap to supply power to an auxiliary load bus 123. The auxiliary load bus 123 distributes power to auxiliary loads 125, 127, 129 either directly, or through a voltage converter 131.

A temperature element 133 such as a thermocouple or RTD (resistance temperature detector) is placed within the trailer box 134 to acquire the trailer box interior temperature.

As an example, an electric refrigeration system may employ a diesel engine having a mechanical power output of 24.5 kW which is coupled to a 460 Vac, 19 kW three phase alternator 103. The engine-alternator 103 provides power to a 460 Vac compressor 107 which may consume from about 5 to 10 kW depending on refrigeration demand. Excess generating capacity is determined by $$\text{excess capacity}=\text{engine/alternator rated capacity}-\text{total refrigeration load}. \quad (1)$$

For a desired −4° F. (−20° C.) inside box temperature with an 86° F. (30° C.) ambient outside temperature, the compressor 107 may consume 5 kW. For a desired 32° F. (0° C.) box temperature with an 86° F. (30° C.) ambient outside temperature, the compressor 107 may consume 10 kW. Additional power is supplied to the condenser 109 and evaporator 111 fans which may consume 2.3 kW. Available, excess capacity depends on compressor load and from (1), may range from 6.7 kW=19 kW−(10 kW+2.3 kW) to 11.7 kW=19 kW−(5 kW+2.3 kW).

Figure 2:
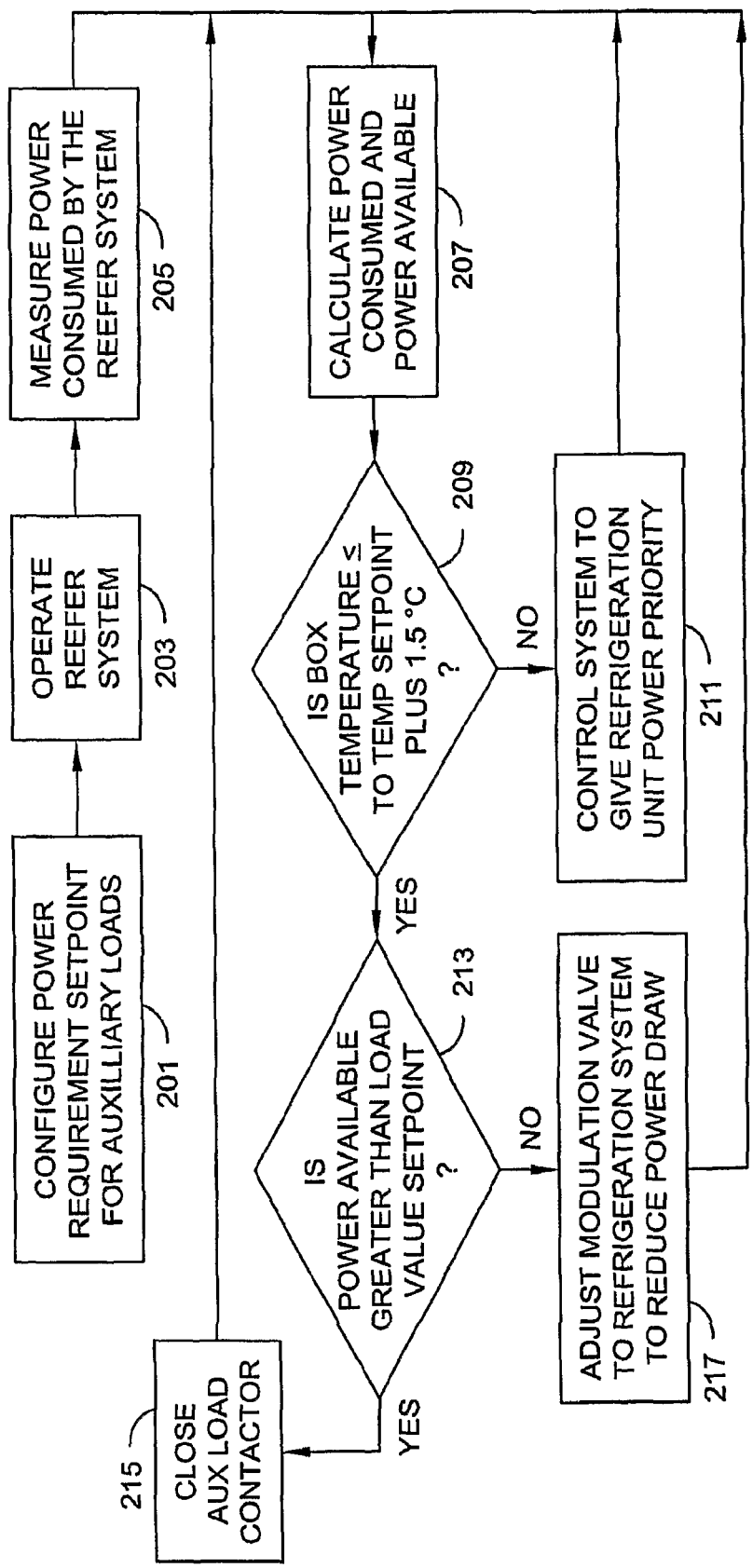
FIG. 2 is an exemplary method for the auxiliary power system.

The controller 117 controls the amount of available excess power as shown in FIG. 2. A user sets a predefined auxiliary load setpoint 120 in kW (step 201) and a desired trailer box interior temperature setpoint in ° F. (or ° C.) 119, which may be the same refrigeration system temperature setpoint. As the refrigeration system operates (step 203), the controller 117 calculates the power consumed by the refrigeration system (step 205). Stored in the controller 117 memory is the rated output of the engine-generator/alternator 103. The controller 117 calculates the available excess capacity for auxiliary loads (step 207).

The controller 117 monitors the trailer box inside temperature 133 and compares it to the temperature setpoint 119. A 2.7° F. (1.5° C.) deadband (reset differential) is used (step 209). Deadband is the difference between the setpoint 119 value and a reset point in the decreasing direction. If the trailer box temperature 133 is greater than or equal to the temperature setpoint 119, the refrigeration system has priority regarding power consumption and the auxiliary load contactor 121 is opened (if closed) shedding any auxiliary loads. If the trailer box temperature is less than or equal to the temperature setpoint 119 (less 2.7° F. (1.5° C.) deadband) (step 209), (1) provides the amount of capacity available for auxiliary loads (step 213).

If the available capacity is greater than the auxiliary load setpoint 120, the controller allows the auxiliary contactor 121 to close, supplying power to the auxiliary loads (step 215). If the available capacity is less than or equal to the load setpoint 120, the auxiliary contactor 121 is opened and the auxiliary loads are shed. The controller 117 adjusts the refrigeration system compressor modulation valve 108 to unload the compressor and lessen refrigeration power consumption (step 217).

The controller 117 modulates a compressor suction modulation valve 108 based on a current limit (for example, 26 Amps for high engine speed and 22 Amps for low engine speed). The load setpoint 120 may be set to a lower value in order to allow for more or continuous auxiliary power available. When the trailer box 134 temperature 133 is below setpoint 119, if the unit is in a start/stop mode, the engine 103 will shut down for fuel savings. With the invention, if the trailer box 134 temperature 133 is less than setpoint 119, the unit will shed its cooling loads (compressor 107 and evaporator fans) and the generator/engine will continue to run to provide power for the auxiliary loads. The other operating mode is continuous run in which the unit will not shut down but will cycle from cool to hot if temperature is below setpoint.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for providing electric power for auxiliary electric loads from an electric transport refrigeration system used to cool a trailer box comprising:
    setting a trailer box interior temperature setpoint;
    setting an auxiliary electric load setpoint;
    calculating a total electrical load for the electric transport refrigeration system;
    calculating excess generating capacity between the total electrical load for the electric transport refrigeration system and an electric transport refrigeration system rated generation capacity; and
    providing auxiliary power if the trailer box temperature is less than or equal to the trailer box temperature setpoint and the calculated excess generated capacity is greater than the auxiliary electric load setpoint.

2. The method according to claim 1 further comprising adjusting a compressor suction modulation valve to lessen total refrigeration system load if the trailer box temperature is less than or equal to the trailer box temperature setpoint and if the calculated excess generated capacity is less than or equal to the auxiliary electric load setpoint.

3. The method according to claim 2 further comprising using a voltage converter between an auxiliary load and the transport refrigeration system auxiliary electric power if the auxiliary load requires a different voltage level.

4. The method of claim 1 wherein:
    the electric transport refrigeration system comprises a controller;
    the trailer box interior temperature setpoint and the auxiliary load setpoint are entered as inputs to the controller by a user; and
    the controller calculates the total electrical load and the excess generating capacity.

5. The method of claim 4 wherein:
    the controller controls the providing auxiliary power.

6. The method of claim 5 further comprising:
    adjusting a compressor suction modulation valve to lessen total refrigeration system load if the trailer box temperature is less than or equal to the trailer box temperature setpoint and if the calculated excess generated capacity is less than or equal to the auxiliary electric load setpoint.

7. The method of claim 6 wherein:
    the adjusting of the compressor suction modulation valve is controlled by the controller.

8. The method of claim 4 wherein:
    the providing auxiliary power comprises powering at least one of:
    a remote fuel tank heater;
    a remote fan;
    remote lighting equipment; and
    a trailer floor heating device.

9. The method of claim 4 further comprising:
    operating an engine/generator or engine/alternator combination to provide said excess generating capacity.

10. The method of claim 9, wherein:
    the engine/generator or engine/alternator comprises a single engine powering both the total electric load for the electric transport refrigeration system and the auxiliary power.

11. The method of claim 1 wherein:
the providing auxiliary power comprises powering at least one of:
- a remote fuel tank heater;
- a remote fan;
- remote lighting equipment; and
- a trailer floor heating device.

12. The method of claim 11 further comprising:
operating an engine/generator or engine/alternator combination to provide said excess generating capacity.

13. The method of claim 12, wherein:
the engine/generator or engine/alternator comprises a single engine powering both the total electric load for the electric transport refrigeration system and the auxiliary power.

14. A system for providing electric power for auxiliary electric loads from an electric transport refrigeration system used to cool a trailer box comprising:
- means for setting a trailer box temperature setpoint;
- means for setting an auxiliary electric load setpoint;
- means for calculating a total electrical load for the electric transport refrigeration system;
- means for calculating excess generating capacity between the total electrical load for the electric transport refrigeration system and an electric transport refrigeration system rated generation capacity; and
- means for providing auxiliary power if the trailer box temperature is less than or equal to the trailer box temperature setpoint and the calculated excess generated capacity is greater than the auxiliary electric load setpoint.

15. The system according to claim 14 further comprising means for adjusting a compressor suction modulation valve to lessen total refrigeration system load if the trailer box temperature is less than or equal to the trailer box temperature setpoint and if the calculated excess generated capacity is less than or equal to the auxiliary electric load setpoint.

16. The system according to claim 15 further comprising coupling a voltage converter between an auxiliary load and the transport refrigeration system auxiliary electric power if the auxiliary load requires a different voltage level.

17. The system of claim 14, further comprising:
an engine/generator or engine/alternator combination for providing said excess generating capacity.

18. The system of claim 17, wherein
the engine/generator or engine/alternator combination has a single engine for providing the total electrical load and the auxiliary power.

* * * * *